United States Patent [19]

Pinnavaia et al.

[11] Patent Number: 5,234,877
[45] Date of Patent: Aug. 10, 1993

[54] COMPOSITE CLAY MATERIALS FOR REMOVAL OF $SO_x$ FROM GAS STREAMS

[75] Inventors: Thomas J. Pinnavaia, East Lansing; Christine A. Polansky, Ithaca; Jayantha Amarasekera, East Lansing, all of Mich.

[73] Assignee: Board of Trustees operating Michigan State University, East Lansing, Mich.

[21] Appl. No.: 986,509

[22] Filed: Dec. 7, 1992

Related U.S. Application Data

[63] Continuation of Ser. No. 553,254, Jul. 16, 1990, Pat. No. 5,219,536.

[51] Int. Cl.$^5$ .............................................. B01J 21/16
[52] U.S. Cl. ...................................... 502/84; 110/345
[58] Field of Search ........................... 502/84; 110/345

[56] References Cited

U.S. PATENT DOCUMENTS

| | | | |
|---|---|---|---|
| 3,862,054 | 1/1975 | Sokolsky et al. | 502/84 |
| 4,419,273 | 12/1983 | Santilli et al. | 502/84 |
| 4,731,233 | 3/1988 | Thompson et al. | 423/231 |
| 5,126,300 | 6/1992 | Pinnavaia et al. | 502/84 |
| 5,137,855 | 8/1992 | Hegedus et al. | 502/84 |
| 5,171,552 | 12/1992 | Miura et al. | 110/345 |

OTHER PUBLICATIONS

Chang, J. C. S., et al "Fossil Fuels Util: Environ. Concerns" Eds. R. Markus., B. Blaus.) (Chap. 15) (1986).
T. J. Pinnavaia in "Chem. Physics of Intercalation", Ed. by A. P. Legrand & S. Flandrois, NATO ASI Series, Series B: Physics vol. 172, pp. 233–252, (1987).
Jozewicz, W., et al React. Solids 6: 243 (1988).
Gullett, B. K. & Blom, J. A., React. Solids 3: 337 (1987).
Gullett, B. K., et al React. Solids, 6: 263 (1988).
Chang, J. C. S. & Kaplan, N., Envir. Prog. 3: 267 (1984).
Thibault, J. D., et al Chem. Eng., 60:796 (1982).
Chang, E. Y. & Thodes, G., AIChE, J., 30: 450 (1984).
Fuller, E. L. & Yoos, T. R., Langmuir, 3: 753 (1987).
Jozewicz, W. & Rochelle, G. T., Envir. Prog. 5: 219 (1986).
Jozewicz, W., et al JAPCA, 38:1027 (1988).
Jozewicz, W., et al JAPCA, 38:796 (1988).
Jozewicz, W., et al. EPX/600/D-87/095, (NTIS PB87-175857/AS) (1987).
Jozewicz, W., et al EPX/600/D-87/135, (NTIS PB87-182663 (1987).

*Primary Examiner*—Carl F. Dees
*Attorney, Agent, or Firm*—Ian C. McLeod

[57] ABSTRACT

A method for preparing and using compositions including a smectite clay and a base or base precursor which reacts with $SO_x$ in a hot flue gas is described. The base or base precursor is preferably the dispersed phase in the bulk phase of the clay. The compositions are heated to form the base which reacts with $SO_x$ in the flue gas.

8 Claims, 5 Drawing Sheets

COMPOSITE CLAY MATERIALS FOR REMOVAL OF $SO_x$ FROM GAS STREAMS

This is a continuation of copending application Ser. No. 07/553,254 filed on Jul. 16, 1990, and now U.S. Pat. No. 5,219,536.

BACKGROUND OF THE INVENTION

(1) Field of the Invention

This invention relates to alkali and alkali earth oxides or carbonates supported on clays where the host clay belongs to the smectite group, and to a method of preparing them. More particularly, it relates to the method of developing improved composite materials for use in $SO_x$, (sulfur dioxide and sulfur trioxide), removal from flue gas.

(2) Prior Art

The first example of flue gas scrubbing for sulfur dioxide control occurred in London, England, in 1933. However, the application of this technology to coal-fired utility boilers in the United States did not begin until the 1970's. The first large-scale application of flue gas scrubbing using lime or limestone was installed in 1964, in the Soviet Union. This facility was followed by an installation at a large sulfuric acid plant in Japan in 1966. In 1970, the Clean Air Act Amendments were adopted. This legislation provided for enforcement, by the United States Environmental Protection Agency (EPA), of $SO_x$ emissions limits for power plants constructed or modified after August 17, 1971. This Act spurred extensive flue gas desulfurization (FGD) research. As of January 1984, calcium-based, wet, throwaway systems (including lime, limestone, and alkaline-ash systems) accounted for 84 percent of existing and planned FGD capacity. The Clean Air Act was amended in 1977 to require further control of $SO_x$ emissions. Increasing federal regulations and the high cost to construct and operate existing wet FGD units have encouraged continued research on new or modified flue gas cleanup processes.

Controlling the emissions of $SO_x$ from power plants is a world-wide problem due to its relationship to "acid rain." Therefore, research into its control is a global effort. Example of a recent patent using calcium based systems to reduce $SO_x$ emissions is Thompson and Nuzio, U.S. Pat. No. 4,731,233. In most cases a commercial source of limestone or lime is used due to cost effectiveness and available quantities.

There are a number of ways to control $SO_x$ emissions in existing power plants or features that can be included in construction of new power plants. These approaches can be classified according to the position in the combustion system at which pollutant control technology is applied. Precombustion control involves removal of sulfur, nitrogen and ash compounds from the fuel before it is burned. In most cases this involves application of coal-cleaning technology. Combustion control includes staged combustion, boiler limestone injection, and fluidized-bed combustion with limestone addition. Postcombustion control involves removal of pollutants after they have been formed but before they are released into the atmosphere. This would include in-duct dry sorbent injection, induct spray drying and combined electrostatic precipitator (ESP)/fabric filter sorbent injection (Jozewicz, W., Chang, J. C. S., Sedman, C. B. and Brna, T. G., React. Solids, 6 243 (1988)).

Flue gas treatment systems can be classified as either wet or dry based on the moisture content of the treated flue gas and the spent sorbent. Wet systems completely saturate the flue gas with water vapor. The flue gas is contacted with a liquid or slurry stream. Dry systems contact the flue gas with a dry or wet sorbent but never include enough water for complete saturation of the flue gas. Dry systems result in a dry product or spent sorbent material, while wet systems result in either a slurry or a sludge.

Although calcium based systems are the major source of $SO_x$ control they are not without problems. Agglomeration of particles can be a serious problem that results in a less than optimal conversion to $CaSO_x$, ($CaSO_3$ and $CaSO_4$). The activity of the calcium species decreases as its particle size increases. Also $CaSO_x$ occupies more volume than CaO, the common active species. Therefore, an increase in volume occurs as the reaction proceeds, which causes a loss in the original porous character of the CaO. This results in a blockage of $SO_x$ and $O_2$ to the active CaO centers (Gullett, B. K. and Blom, J. A., React. Solids, 3 337 (1987): Gullett, B. K., Blom, J. A. and Cunningham, R. T., React. Solids, 6 263 (1988); Chang, E. Y. and Thodes, G., AIChE J., 30 450 (1984); Thibault, J. D., Steward, F. R. and Ruthven, D. M., Can. J. Chem. Eng., 60 796 (1982)).

Prior art in this field has used limestone, lime or hydrated lime as a precursor for the active CaO species or has used $Ca(OH)_2$ as the active species. Generally, the active species has been used as a bulk phase and not as a dispersed species (Chang, J. C. S. and Kaplan, N., Envir. Prog., 3 267 (1984); Gullett, B. K., Blom, J. A. and Cunningham, R. T., React. Solids, 6 263 (1988); Chang, E. Y. and Thodes, G., AIChE J., 30 450 (1984); Fuller, E. L. and Yoos, T. R., Langmuir, 3 753 (1987)). Recent work has concentrated on the addition of fly ash to $Ca(OH)_2$ to enhance its activity in $SO_x$ control (Jozewicz, W. and Rochelle, G. T., Envir. Prog. 5 219 (1986); Jozewicz, W., Chang, J. C. S., Sedman, C. B. and Brna, T. G., JAPCA, 38 1027 (1988); Jozewicz, W., Jorgensen, C., Chang, J. C. S., Sedman, C. B. and Brna, T. G., JAPCA, 38 796 (1988); Jozewicz, W., Chang, J. C. S., Sedman, C. B. and Brna, T. G., React. Solids, 6 243 (1988); Jozewicz, W., Chang, J. C. S., Sedman, C. B. and Brna, T. G., EPA/600/D-87/095, (NTIS PB87-175857/AS); Jozewicz, W., Chang, J. C. S., Sedman, C. B. and Brna, T. G., EPA/600/D-87/135, (NTIS PB87-182663). The fly ash is a siliceous material and the formation of various calcium silicates can occur. Several diatomaceous earths, montmorillonite clays, and kaolins have also been identified as containing reactive silica (Jozewicz, W., Chang, J. C. S., Sedman, C. B. and Brna, T. G., React. Solids, 6 243 (1988)).

It is therefore an object of the present invention to provide a method for preparing improved sorbent compositions including a smectite clay as the bulk phase and with a relatively smaller amount of a basic compound as the active phase. Further, it is an object of the present invention to provide improved compositions which are more active over time, thus more effective in $SO_x$ removal. Further still, it is an object of the present invention to provide compositions which are relatively economical to prepare and use. These and other objects will become increasingly apparent from the following description and the drawings.

GENERAL DESCRIPTION

The present invention relates to a method for preparing a composite material useful for removing $SO_x$ from a gas stream which comprises: providing a suspension of a smectite clay in water; providing a basic compound selected from the group consisting of alkali metal and alkaline earth metal salts and bases in the suspension with the clay; and drying the suspension to provide the composite material, wherein when the composite material is heated, preferably to at least about 500° C., the $SO_x$ is removed from the gas by the basic compound.

Further, the present invention relates to a method of preparing a composite material, capable of removing $SO_x$ from a gas stream comprising the steps: providing a suspension of a smectite clay in water; introducing a quantity of a basic compound selected from the group consisting of a base and a base precursor into the clay suspension; and drying the suspension in air, wherein when the composite material is heated, preferably to at least about 500° C., the $SO_x$ is removed from the gas.

Further still, the present invention relates to a method for preparing a composite material capable of removing $SO_x$ from a gas stream comprising the steps of: providing a suspension containing a smectite clay in water; dissolving an amount of sodium carbonate in the suspension of the clay; adding a soluble alkaline earth metal salt in stoichiometric amount for reaction with the sodium carbonate to form an alkaline earth metal carbonate precipitate in the suspension with the clay; washing the composite; and drying the suspension to provide the composite material, wherein when the composite material is heated, preferably to at least about 500° C.

Finally the present invention relates to a composition for use in removing $SO_x$ from a gas stream when the composite material is heated, preferably to at least about 500° C., which comprises in admixture: a basic compound selected from the group consisting of alkali metal and alkaline earth metal salts and bases; and a smectite clay, wherein the basic compound is provided in an aqueous suspension with the clay and then dried to form the composition.

The present invention provides a method for production of composite materials consisting of alkali or alkali earth metal/smectite clay composites, of varying alkali or alkali earth metal/clay ratios than has heretofore been known in the prior art, specifically by causing the precipitation of $CaCO_3$ or $Ca(OH)_2$ from salts onto and into the clay particle while the clay is in suspension and by the impregnation of sodium or calcium species into the clay particle by the addition of an aqueous solution of alkali or alkali earth species to a suspension of clay to produce these ratios. The resulting materials are used to remove $SO_x$ from flue gas.

In accordance with one method of the invention, a 0.5 to 1.5 weight percent aqueous suspension of clay was initially prepared. An aqueous solution of $Na_2CO_3$ was added dropwise to the clay suspension while it was stirred. This was followed by a similar addition of $CaCl_2.2H_2O$. The addition of the calcium species caused the precipitation of $CaCO_3$. The amount of $Na_2CO_3$ and $CaCl_2.2H_2O$ can be varied to provide the desired weight ratio of $CaCO_3$ to clay. The product was washed with deionized distilled water, either by centrifugation/decantation or by dialysis, to remove the excess chloride and sodium ions before drying at room temperature or in an oven at 100° C. The wash was checked with a silver nitrate solution for precipitation of silver chloride. A negative test for silver chloride indicated that the chloride had been removed. Washing the preparation was preferred, because reactivity with $SO_x$ was diminished if no attempt was made to remove the chloride. The adverse effect of chloride on $SO_x$ removal has also been verified by another study which evaluated the effects of magnesium and chloride ions on the performance of limestone-regenerated dual alkali processes under closed-loop operating conditions (Chang, J. C. S., Kaplan, N. and Brna. T. G. in "Fossil Fuels Utilization: Environmental Concerns" (Eds. R. Markuszewski, B. Blaustein) Chap. 15). Limestone reactivity decreased with the increase of chloride ion concentration. The effect was especially pronounced after a concentration of 80,000 ppm was reached.

X-ray powder diffraction (XRPD) indicates that the clay retains its original layered structure with a basal spacing of approximately every 10 Å. Crystalline $CaCO_3$ is also present in the XRPD pattern.

The precipitation of $Ca(OH)_2$ was carried out using a similar method. A 50 wt. % solution of NaOH containing the desired amount of $OH^-$ was added to water. The solution was added dropwise to the clay suspension while stirring. An aqueous solution of $CaCl_2.2H_2O$ was added in a similar manner after addition of the NaOH solution.

In situ precipitation resulted in smaller $CaCO_3$ particle size than can be attained through a physical mixture of $CaCO_3$ and the clay.

An oxidation catalyst was also added to some of the composite preparations. Iron was added in the form of $FeCl_3.6H_2O$ or $Fe(NO_3)_3.9H_2O$. $Fe_2O_3$ was formed upon thermal decomposition of the salts; and catalyzed the oxidation of $SO_2$ to $SO_3$. $SO_3$ reacts with calcium oxide at lower temperatures than $SO_2$ resulting in a wider temperature window for the removal of $SO_x$ from the gas stream. Various transition metals can be used as oxidation catalysts.

Prior to exposure to $SO_2$ the product was heated to 900° C. in air. Thermal gravimetric analysis (TGA) indicated the loss of $H_2O$ and $CO_2$ based upon mass measurements of the sample. The thermal treatment caused the decomposition of $CaCO_3$ to CaO. It also caused a severe drop in the clay intensity present in the pattern with only a low intensity remaining at 9.4 Å for the $CaCO_3$/Na-montmorillonite composite.

A second method of preparing a highly dispersed alkali or alkali earth metal species was the impregnation of a water soluble sodium or calcium compound onto the clay. As previously described, the desired amount of dissolved alkali metal or alkali earth metal carbonate species was added to the clay suspension while the suspension was stirred. Calcium formate, calcium acetate and sodium bicarbonate have been used as example preparations, but other soluble alkali metal and alkaline earth metal salts may be used. Washing was not necessary in these latter preparations that were chloride free. The suspension was air dried on a glass plate at room temperature.

An XRPD pattern of calcium formate and Na-montmorillonite in a 1:1 weight ratio contained crystalline calcium formate peaks and $d_{(001)}$ spacing typical of the clay (10.9 Å). A small peak also occurred at a d-spacing of 22.7 Å, indicating that some intercalation of the formate species occurred. In contrast, the XRPD pattern for a calcium acetat/Na-montmorillonite composite prepared using the impregnation method did not exhibit crystalline calcium acetate. Instead, a major reflection occurred at a d-spacing of 24.0 Å, indicating that most of the calcium acetate species formed a nanocomposite with the clay by intercalation into the interlayer of the clay host forming a new composition of matter. (T. J. Pinnavaia in "Chemical Physics of Intercalation", Ed. by A. P. Legrand and S. Flandrois, NATO ASI Series, Series B: Physics Vol. 172, pp 233-252, (1987)).

The products resulting from this invention constitute a calcium/clay composite in the case of precipitated $CaCO_3$ from the previously mentioned salts or impregnation of $Ca(CHOO)_2$, $Ca(CH_3CO_2)_2$ or $NaHCO_3$. A sodium/clay composite is formed in the case of impregnated $NaHCO_3$. A more intermediate interaction between the clay and the calcium acetate occurred during the impregnation method, as evidenced by a change in the clay XRPD pattern, resulting in a regularly intercalated clay non-composite.

Although $CaCO_3$, $NaHCO_3$, $Ca(CHO_2)_2$, and $Ca(CH_3CO_2)_2$ are suitable bases or base precursors for $SO_x$ removal in the temperature range 100°-900° C. by composite formation with smectite clay, certain calcium salts such as calcium hydroxide (quicklime), $Ca(OH)_2$, is not a suitable reagent for this purpose because the salt is too unstable on the clay support at high temperatures, presumably due to chemical reaction with the clay support, and its ability to remove $SO_x$ from a gas stream is lost.

The particle size of the smectite clay is preferably less than about 2 microns. A particle size between about 0.1 and 2 microns is preferred.

A weight ratio of about 1 to 3 and 5 to 1 for salt to clay is preferred. Any weight ratio which produces effective $SO_x$ removal from flue gas can be used, preferably where the bulk phase is the clay.

The composite material can be dried by various means including spray drying, tray drying and the like. The solids can be removed from solution by centrifuging with intermediate washing steps with water.

SPECIFIC DESCRIPTION

Example 1

Na-montmorillonite from Crook County, Wyoming USA was selected as the representative member of the smectite family of 2:1 layer lattice silicates. A 1.4 weight percent, wt. %, of clay was dispersed in deionized distilled water. An upper limit of 2 micron particle size was achieved by sedimentation in water and application of Stokes' law of settling under gravity. The procedure was followed twice. Sedimentation also removed quartz and other insoluble impurities that may have been present in the clay. After purification the clay was air dried on a glass plate or stored in an aqueous suspension.

A desired weight ratio, A:Z, of $CaCO_3$:Na-montmorillonite was achieved by preparing a 1.4 wt. % solution of Na-montmorillonite in deionized distilled water. A total weight of 20 grams of solution was used. In the example of $A=Z=1$, 0.28 grams of $CaCO_3$ or $2.8 \times 10^{-3}$ mole was desired. Therefore, $2.8 \times 10^{-3}$ mole of $Na_2CO_3$ was dissolved in deionized distilled water with a total solution weight of 20 grams. The $Na_2CO_3$ solution was slowly added to the Na-montmorillonite suspension while stirring. A similar solution of $CaCl_2 \cdot H_2O$ was added to the solution after addition of the $Na_2CO_3$ solution was complete. The sodium salt is added first to discourage cation exchange of the calcium with the sodium in the montmorillonite.

Figure 1:
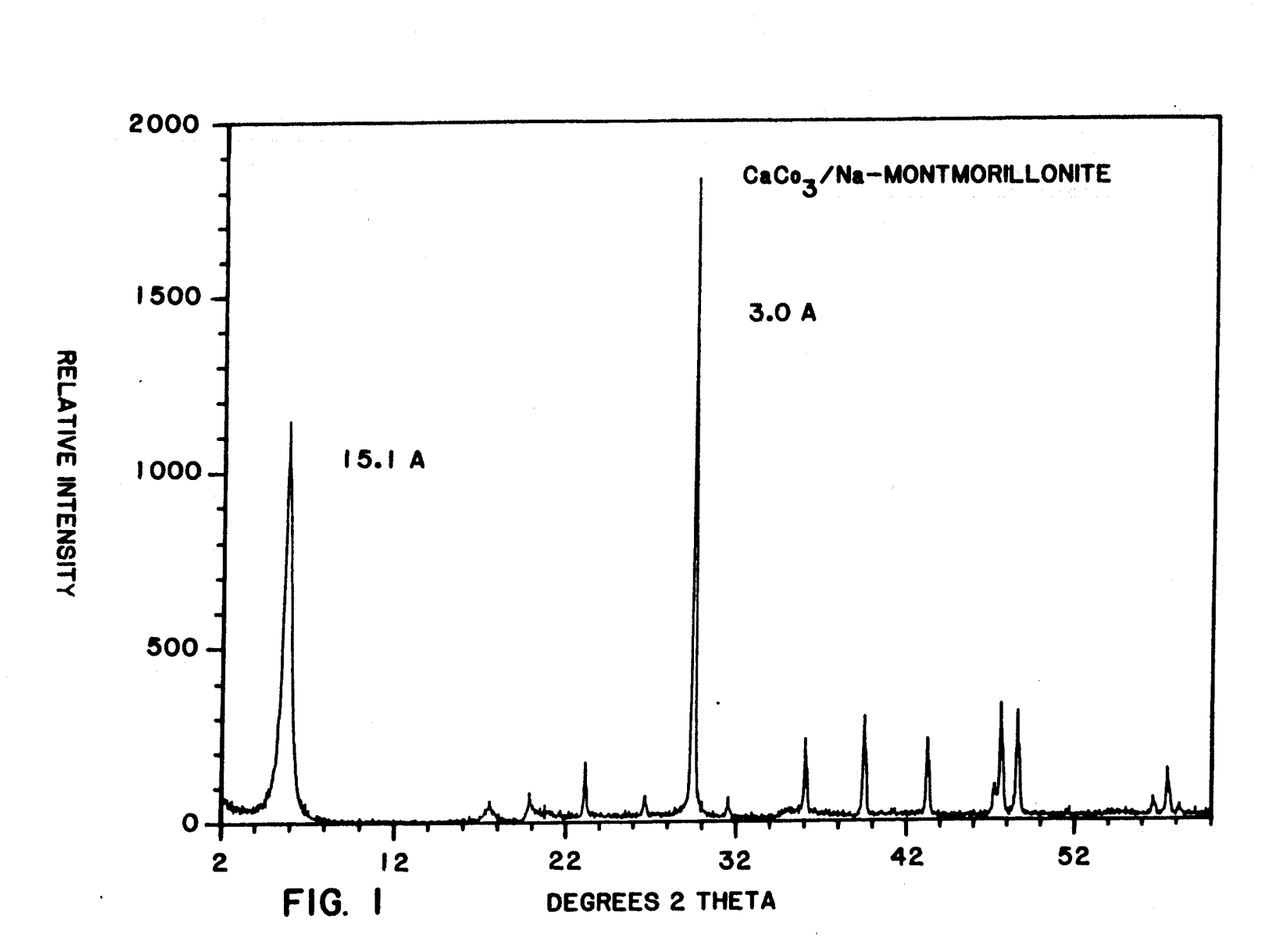
FIG. 1 is a graph showing a Cu K alpha XRPD pattern of the A:Z, A=1, Z=1, $CaCO_3$:Na-montmorillonite composite designated 1.

After preparation the product was washed and centrifuged repeatedly with deionized distilled water to remove excess chloride and sodium ions. The wash was tested with a solution of silver nitrate to determine the absence of chloride ions. The product was dried on a glass plate at ambient temperature. An XRPD pattern of the product is shown in FIG. 1. The reflection at 5.8° (15.1 Å) is the major Na-montmorillonite peak and the peak at 29.5° (3.0 Å) is the major peak of $CaCO_3$.

Figure 2:
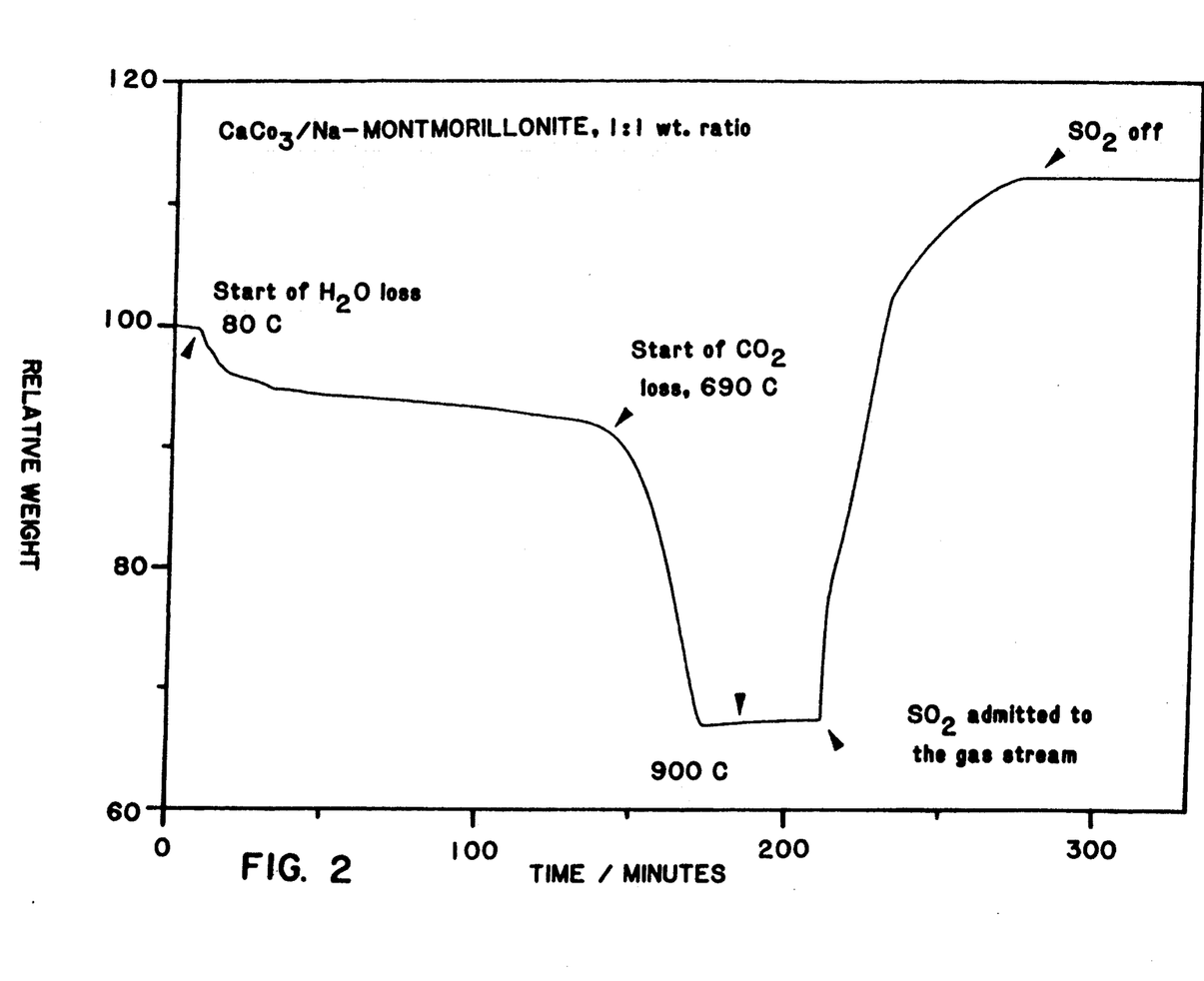
FIG. 2 is a graph showing a TGA profile of Sample 1.

A sample prepared as described above was evaluated and was shown to be active for $SO_2$ removal from a gas mixture. The sample was heated to 900° C. at a rate of 5° C./min and maintained at 900° C. for 30 minutes prior to the introduction of 5000 ppm $SO_2$ for 1 hour in flowing air. The uptake of $SO_2$ is illustrated in FIG. 2. The sample removed an 88% $CaCO_3$ conversion, with 19% conversion occurring within the first minute. The conversion is based upon the following reaction:

$$CaO + SO_2 + O_2 \xrightarrow{900°} CaSO_4.$$

Examples 2 and 3

Figure 3:
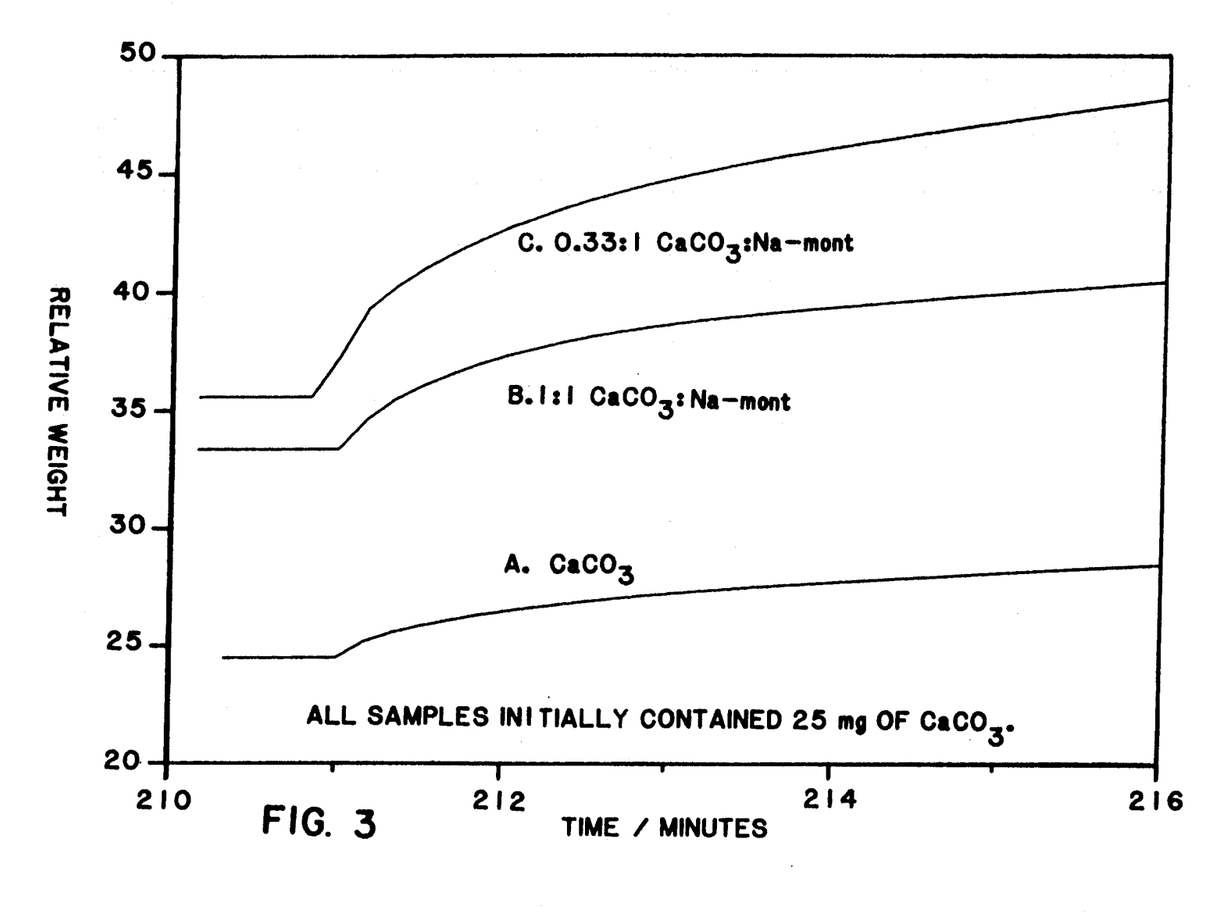
FIG. 3 is a graph showing the initial $SO_2$ uptake of Samples 1 and precipitated $CaCO_3$.

Examples 2 and 3 provided products, designated samples 2 and 3, respectively, that were prepared utilizing the procedures of Example 1, with the weights of $Na_2CO_3$ and $CaCl_2 \cdot 2H_2O$ varied to yield respective values of $A=3$, $Z=1$; $A=0.33$, $Z=1$. Samples of 2 and 3 were tested for $SO_2$ uptake following the procedure cited in Example 1. Sample 2 exhibited a total CaC03 conversion of 100% with 14% of the conversion occurring during the first minute of the reaction. Sample 3 gave a total CaC03 conversion of 100%, with conversion after 1 minute of 36%. FIG. 3 illustrates the differences in initial $SO_2$ uptake by Samples 1, 3 and $CaCO_3$ caused by varying the $CaCO_3$:Na-montmorillonite weight ratio.

Examples 4 to 6

A series of 1:1 $CaCO_3$:smectite clay composites in accordance with the method of Example 1, were prepared using other members of the smectite family in place of purified montmorillonite, Bentone EW P&G GST-865 (Sample 4); nontronite (Sample 5); fluorohectorite (Sample 6). These composite preparations were tested for $SO_2$ reactivity according to the method described in Example 1. After 1 hour of reaction, the Bentone preparation gave a total conversion of 98%, the nontronite sample gave a total conversion of 78% and the fluorohectorite sample gave a total conversion of 90%.

Examples 7 to 9

A series of A:Z Na-montmorillonite samples in accordance with the invention were prepared utilizing the procedures of Example 1, but the washing procedure was eliminated and the drying temperature was varied. Samples 7 and 8 had $A=1$, $Z=1$ and $A=0.33$, $Z=1$, respectively, and were dried at room temperature. Sample 9 had $A=1$, $Z=1$ and was dried at 100° C. in air. Samples 7 to 9 had total conversions of 52, 59 and 42%, respectively, as determined by the test conditions cited in Example 1. The chloride ion interferes with the conversion.

Example 10

An iron-containing $CaCO_3$:Na-montmorillonite composite, designated Sample 10, with $A=Z=1$ was prepared by a co-precipitation method using $FeCl_3.6H_2O$ as the iron source. The addition of $Na_2CO_3$ was carried out in accordance with the method described in Example 1, except that $FeCl_3.6H_2O$ was added to the $CaCl_2.2H_2O$ solution to yield a composite containing an Fe content of 1.5 wt. %. The sample exhibited a total $CaCO_3$ conversion of 42.5% 1 hour reaction with $SO_2$ under the conditions described in Example 1.

Example 11

An iron containing $CaCO_3$:Na-montmorillonite sample, designated Sample 11, with $A=Z=1$ was prepared using $Fe(NO_3)_3.9H_2O$ as the source. A $CaCO_3$:Na-montmorillonite composite with $A=1$, $Z=1$ was prepared according to the procedure described in Example 1. A 0.5 wt. % quantity of $Fe(NO_3)_3.9H_2O$ was dissolved in deionized distilled water and was added to the $CaCO_3$/Na-montmorillonite suspension. The product was air dried on a glass plate at room temperature. The sample showed a total $CaCO_3$ conversion of 88% after 1 hour reaction with $SO_2$ under the conditions described in Example 1.

Examples 12 and 13

A 1:1 by weight composite of $Ca(OH)_2$ and Na-montmorillonite, designated Sample 12, was prepared by NaOH, $CaCl_2.2H_2O$ and Na-montmorillonite as starting materials. An amount of a 50 weight percent NaOH solution appropriate for the stoichiometric reaction with $CaCl_2.2H_2O$ was added to a stirred 50 gram of a 0.5 wt. % suspension of Na-montmorillonite. After the addition of the NaOH, to the clay, an equivalent amount of a solution of $CaCl_2.2H_2O$ was added to the solution to produce the 1:1 $Ca(OH)_2$:Na-montmorillonite composite. The product was washed with deionized distilled water as described in Example 1. A second sample, designated Sample 13, was prepared to afford a 3:1 $Ca(OH)_2$:Na-montmorillonite (Sample 13). The total conversions after 1 hour reaction with $SO_2$ at 900° C. using the test conditions cited in Example 1 were 5 and 1%, respectively, for Samples 12 and 13. In these examples, $Ca(OH)_2$ loses its ability to react with $SO_x$ under these reaction conditions when supported on smectite clay. Presumably the $Ca(OH)_2$ reacts with the clay, forming a calcium silicate that is inert to $SO_x$.

Examples 14 and 15

An amount of calcium formate, $Ca(HCOO)_2$, was dissolved in a minimum amount of deionized distilled water. The solution was slowly added with constant stirring to a 1.4 wt. % slurry of Na-montmorillonite. The amount of $Ca(HCOO)_2$ added to the clay slurry was varied to yield composite with a $Ca(HCOO)_2$:Na-montmorillonite ratio of 1:1, designated Sample 14, and 3:1 designated Sample 15. The products were air dried at room temperature on a glass plate. Sample 14 gave a total conversion based on $Ca(HCOO)_2$ of 60% after 1 hour reaction time with $SO_2$ and a conversion of 24% after the first minute under the conditions described in Example 1. The conversions for Sample 15 were 94% and 14% after 1 hour and 1 minute reaction time, respectively.

Examples 16 to 19

A series of calcium acetate: Na-montmorillonite composite samples in accordance with the invention, were prepared utilizing the procedures of Examples 14 and 15 for the preparation of clay calcium formate composite. The amount of $Ca(H_3CCOO)_2.XH_2O$ used was varied to yield composite with $Ca(CH_3CO_2)_2$:Na-montmorillonite weight ratio of 1:1, designated Sample 16; 1.5:1 designated Sample 17; 0.33:1, designated Sample 18; 5.0:1, designated Sample 19.

Figure 4:
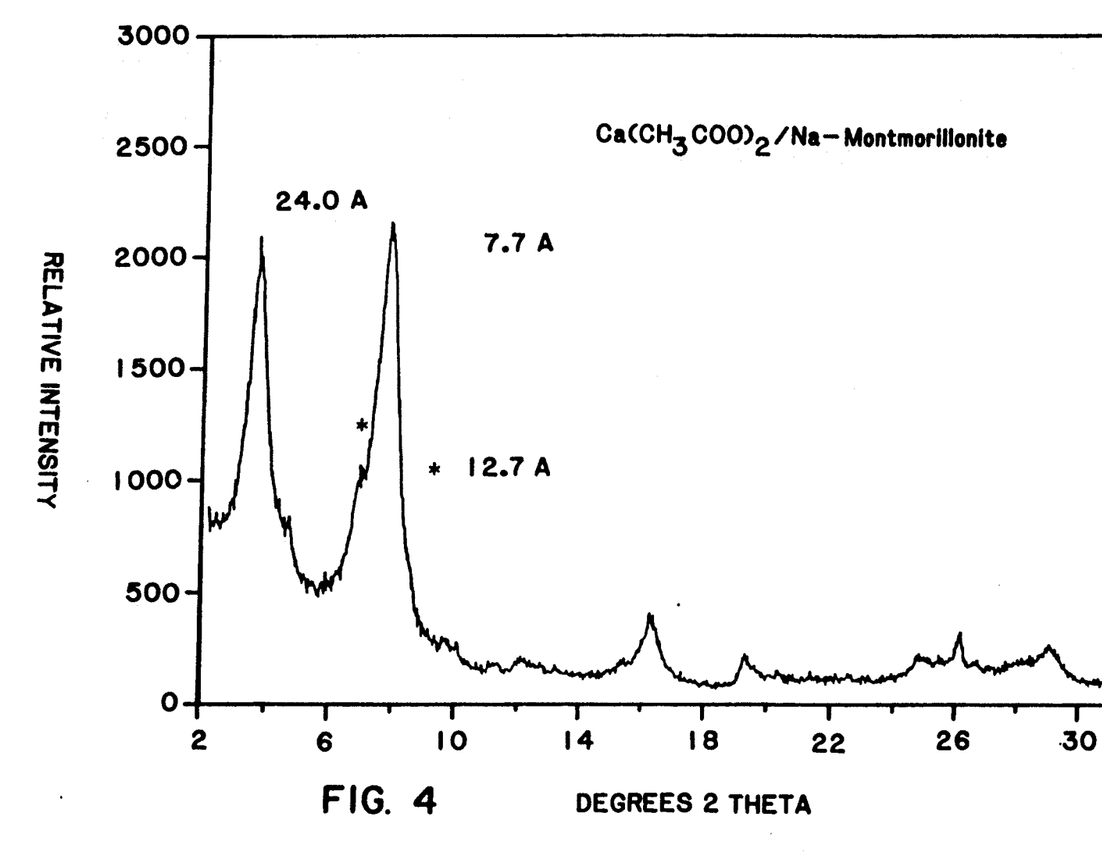
FIG. 4 is a graph showing a Cu K alpha XRPD pattern for Sample 17, 1.5:1, $Ca(CH_3CO_2)_2$:Na-montmorillonite.

An XRPD pattern of the product from Sample 17 is shown in FIG. 4. The pattern does not exhibit any crystalline $Ca(H_3CCOO)_2$ species but it does exhibit an increase in d-spacing for the clay structure, indicating intercalation of the acetate species. The conversions for Samples 16 to 19 after 1 hour reaction time with $SO_2$ were 52, 36, 15 and 78%, under the conditions cited in Example 1.

Example 20

A sample of $NaHCO_3$ supported on Na-montmorillonite was prepared by dissolving the bicarbonate salt in a minimum amount of deionized distilled water and adding the solution slowly to a clay suspension with constant stirring, and allowing the mixture to air dry on a glass plate. The $NaHCO_3$: clay ratio was 1:2. The sample designated Sample 20, gave a total conversion based on $NaHCO_3$ of 31% after 1 hour reaction with $SO_2$ under the test conditions cited in Example 1.

Example 21

A quantity of sample 20 from Example 20 was tested for $SO_2$ reactivity at 500° C. The sample was heated to 500° C. at a ramp rate of 5° C./min until a temperature of 500° C. was reached. The sample was maintained at 500° C. for 30 minutes. An air stream containing 5000 ppm of $SO_2$ then was allowed to flow over the sample for 1 hour, total flow rate of 200 cc/min while the sample was at 500° C. The sample was maintained at 500° C. for an additional 30 minutes without weight loss. The total conversion after 1 hour reaction with $SO_2$ based on $NaHC03$ content was 46%.

Example 22

A quantity of Sample 1 was tested for $SO_2$ uptake at 500° C. under the conditions cited in Example 21. The percent conversion for the sample was 0%. The temperature is too low for effective conversion of the $CaCo_3$.

Example 23

A quantity of sample 1 was tested for $SO_2$ uptake at 700° C. by ramping the temperature at 5° C./min until a temperature of 700° C. was obtained. A temperature of 700° C. was maintained for 30 minutes prior to the introduction of $SO_2$ in air at a concentration of 5000 ppm. The sample was maintained at 700° C. for an additional 30 minutes after the $SO_2$ without weight loss. The percent conversion based on CaCO3 was 11% which indicated that the higher temperature was better.

Example 24

Figure 5:
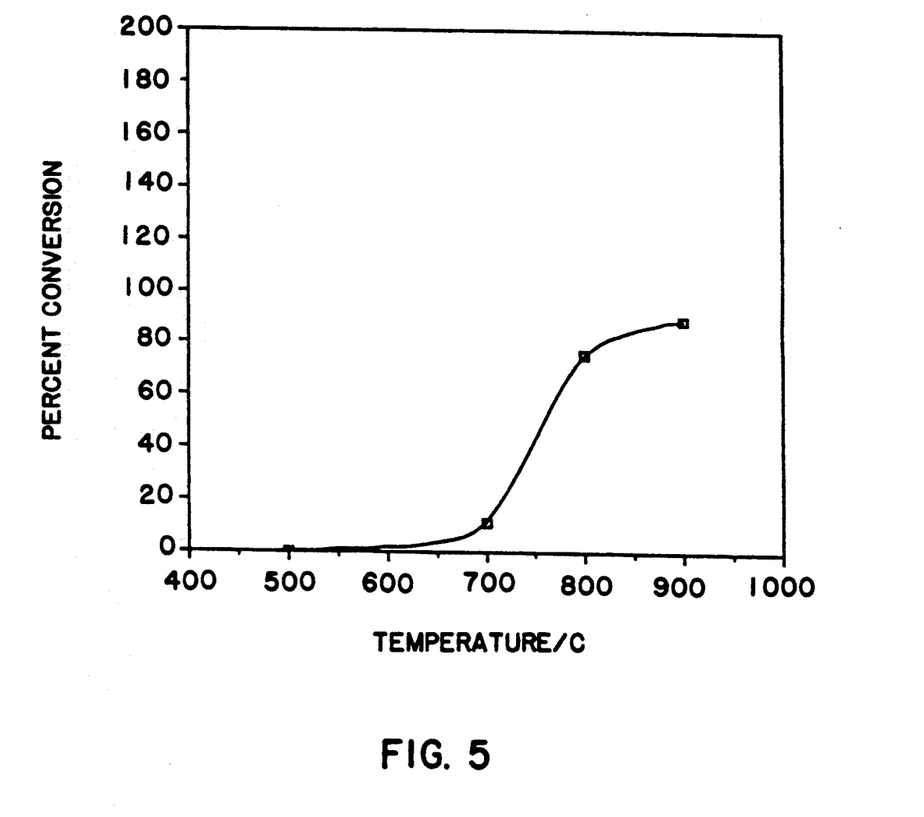
FIG. 5 a graph showing the temperature dependence of $SO_2$ uptake for the 1:1 ratio of $CaCO_3$:Na-Montmorillonite composite, for Samples 1, 22, 23 and 24.

A quantity of sample 1 was tested for $SO_2$ uptake at 800° C. by ramping the temperature at 5° C./min until a temperature of 800° C. was obtained. A temperature of 800° C. was maintained for 30 minutes prior to the introduction of $SO_2$ in air at a concentration of 500 ppm. The sample was maintained without weight loss at 800° C. for an additional 30 minutes after the $SO_2$ had stopped. The percent conversion based on $CaCO_3$ was 75%. The temperature dependence of $SO_2$ uptake for $CaCO_3$/Na-montmorillonite, 1:1 wt. % for samples from Examples 1, 22, 23 and 24 is shown in FIG. 5.

Examples 25 and 26

Two of the preparations were tested for $SO_2$ reactivity under the conditions cited in Example 1 with additional moisture present in the gas stream. A quantity of sample 1 was run at a partial pressure of 0.22 $H_2O$ present in the gas stream and yielded a total conversion of 111%, part of which may be due to moisture uptake by the sample. A second sample from Sample 18 was tested at a partial pressure of 0.064 $H_2O$ and yielded a total conversion of 64%.

Examples 27 and 29

Samples 1, 10 and 11 were tested for $SO_2$ reactivity at 700° C. The samples were ramped to 900° C. as cited in Example 1 and then ramped to 700° C. at 5° C./min. The sample was maintained at 700° C. for 30 minutes before 5000 ppm of $SO_2$ was admitted to the gas stream for 1 hour. Samples 1, 10 and 11 had total conversions of 61, 38 and 54%, respectively, under these conditions.

Example 30

Hectorite from San Bernardino County, California USA, was purified utilizing the procedures of Example 1. A 1:1 $CaCO_3$:hectorite clay composite was prepared in accordance with the method of Example 1. Excess chloride ions were removed by dialysis. The composite preparation was tested for $SO_2$ reactivity according to the method described in Example 1. After 1 hour of reaction, the composite gave a total conversion of 85% with 24% of the reaction occurring within the first minute.

RESULTS OF EXAMPLES

Table 1 lists the values for $SO_2$ uptake after 1 minute and after 1 hour for all of the Examples 1 to 29. Unless otherwise specified, the samples were ramped at 5° C./min until a temperature of 900° C. was reached. The temperature was maintained at 900° C. for 30 minutes prior to admittance of 5000 ppm of $SO_2$ into the gas stream for 1 hour. The sample was maintained at 900° C. for an additional 30 minutes after admission of $SO_2$ had ceased to test the thermal stability of the products.

TABLE 1

| | | | | % Conversion[a] | | |
|---|---|---|---|---|---|---|
| S. # | Base/Clay | Ratio | Rxn. Temp. °C. | 1 min. | 60 min. | Comments |
| 1 | CaCO3/Na-mont | 1:1 | 900 | 19 | 88 | |
| 2 | | 3:1 | 900 | 14 | 100 | |
| 3 | | 0.33:1 | 900 | 36 | 100 | |
| 7 | | 1:1 | 900 | 13 | 52 | |
| 8 | | 0.33:1 | 900 | 15 | 59 | unwashed |
| 9[b] | | 1:1 | 900 | 6 | 42 | unwashed |
| 10 | | 1:1 | 900 | 5 | 43 | FeCl3 doped |
| 11 | | 1:1 | 900 | 13 | 88 | Fe(NO3)3 doped |
| 12 | Ca(OH)2/Na-mont | 1:1 | 900 | c | 5 | |
| 13 | | 3:1 | 900 | c | 1 | |
| 14 | Ca(FOR)/Na-mont | 1:1 | 900 | 24 | 60 | |
| 15 | | 3:1 | 900 | 14 | 94 | |
| 16 | Ca(ACE)/Na-mont | 1:1 | 900 | 25 | 52 | |
| 17 | | 1.5:1 | 900 | 4 | 36 | |
| 18 | | 0.33:1 | 900 | 8 | 15 | |
| 19 | | 5:1 | 900 | 26 | 78 | |
| 20 | NaHCO3/Na-mont | 1:2 | 900 | 11 | 33 | |
| 21 | | 1:2 | 500 | 16 | 46 | |
| | | 1:2 | 100 | active | active | |
| 22 | CaCO3/Na-mont | 1:1 | 500 | c | c | |
| 23 | | 1:1 | 700 | 4 | 11 | |
| 24 | | 1:1 | 800 | 12 | 75 | |
| 25 | | 1:1 | 800 | 34 | 111 | $P_{H2O}$ 0.22 |
| 26 | | 1:1 | 800 | 17 | 64 | $P_{H2O}$ 0.064 |
| 27 | | 1:1 | 700 | 7 | 61 | preheat 900° C. |
| 28 | | 1:1 | 700 | 12 | 38 | preheat 900° C. |
| 29 | | 1:1 | 700 | 9 | 54 | preheat 900° C. |
| 30 | CaCO3/Na+-hectorite | 1:1 | 900 | 24 | 85 | |
| 4 | CaCO3/Bentone | 1:1 | 900 | 14 | 98 | |
| 5 | CaCO3/Nontron | 1:1 | 900 | 26 | 78 | |
| 6 | CaCO3/Fluorhect | 1:1 | 900 | 11 | 90 | |
| | CaCO3 precipitated | | 900 | 9 | 82 | |

[a]   $CaO + SO_2 + O_2 \xrightarrow{900°C.} CaSO_4$
[b] dried at 100° C.
[c] no significant uptake.

The present invention has been particularly set forth in terms of specific embodiments thereof, it will be understood in view of the instant disclosure, that numerous variations upon the invention are now enabling to those skilled in the art, which variations yet reside within the scope of the instant teaching. Accordingly, the present invention is limited only by the hereinafter appended claims.

We claim:

1. A composition for use in removing $SO_x$ from a flue gas stream when the composition is heated which comprises in admixture:
   (a) a basic compound selected from the group consisting of sodium and calcium salts and bases; and
   (b) a smectite clay wherein the ratio of basic compound to clay is between about 1 to 3 and 5 to 1 by weight so that the composition when heated removes $SO_x$ and;
   wherein the basic compound is provided in an aqueous suspension with the clay and then dried to form the composition, wherein the salts or bases are dispersed on the clay and wherein the mixture is a powder.

2. The composition of claim 1 wherein the admixture of an iron salt for oxidizing $SO_2$ to $SO_3$ when the composition is heated which forms $Fe_2O_3$ upon thermal decomposition of the salt.

3. The composition of claim 1 wherein the clay has a particle size of less than about 2 microns.

4. The composition of claim 1 wherein the clay is sedimented in water to provide the clay with the 2 micron particle size.

5. The composition of claim 1 wherein the metal salt or base is selected from the group consisting of calcium carbonate, calcium hydroxide, calcium formate, calcium acetate and sodium bicarbonate.

6. The composition of claim 1 wherein calcium is the alkaline earth metal in the salt or base.

7. The composition of claim 2 wherein the iron salt is selected from the group consisting of iron chloride or iron nitrate.

8. The composition of claim 1 wherein sodium is the alkali metal in the salt or base.

* * * * *